United States Patent [19]
Siddiqui et al.

[11] Patent Number: 5,934,705
[45] Date of Patent: Aug. 10, 1999

[54] TWO CHAMBER INFLATOR BODY

[75] Inventors: Shahid A. Siddiqui, Farmington Hills; Charles C. Bollaert, White Lake, both of Mich.

[73] Assignee: Automotive Systems Laboratory, Inc., Farmington Hills, Mich.

[21] Appl. No.: 08/950,640

[22] Filed: Oct. 15, 1997

Related U.S. Application Data

[60] Provisional application No. 60/040,214, Mar. 6, 1997.

[51] Int. Cl.[6] .................................................. B60R 21/26
[52] U.S. Cl. .......................................... 280/736; 280/741
[58] Field of Search ................................ 280/735, 736, 280/741, 742; 102/530, 531, 443, 478

[56] References Cited

U.S. PATENT DOCUMENTS

| | | | |
|---|---|---|---|
| 3,904,221 | 9/1975 | Shiki et al. ............................ | 280/741 |
| 3,972,545 | 8/1976 | Kirchoff et al. ........................ | 280/741 |
| 5,116,080 | 5/1992 | Wipasuramonton .................... | 280/741 |
| 5,219,178 | 6/1993 | Kobari et al. .......................... | 280/741 |
| 5,533,754 | 7/1996 | Riley ...................................... | 280/741 |
| 5,564,743 | 10/1996 | Marchant ............................... | 280/741 |
| 5,628,528 | 5/1997 | DeSautelle et al. .................... | 280/736 |
| 5,799,973 | 9/1998 | Bauer et al. ............................ | 280/736 |

FOREIGN PATENT DOCUMENTS 0 382 552  9/1990  European Pat. Off. .

*Primary Examiner*—Paul N. Dickson
*Attorney, Agent, or Firm*—Lyon, P.C.

[57] ABSTRACT

A gas generator utilizes two segregated propellant container/combustion chambers, each having a plurality of nonazide propellant grains therein, and each having an igniter for separately igniting the propellant grains located within the respective chambers. An insulating disc disposed between the two chambers precludes flame front and thermal propagation from one chamber to another, thus preventing redeployment of an activated airbag.

1 Claim, 1 Drawing Sheet

TWO CHAMBER INFLATOR BODY

CROSS-REFERENCE TO RELATED APPLICATION

This application is a based on provisional Ser. No. 60/040,214, filed on Mar. 6, 1997.

BACKGROUND OF THE INVENTION

The present invention generally relates to gas generators such as used to inflate air bags in an automobile occupant protection system, and more particularly to an improved gas generator having a dual chamber inflator body wherein each chamber operates independently of the other.

The prior art generally discloses inflation systems for deploying an air bag in a motor vehicle which provide a single gas generator in fluid communication with the uninflated air bag. The gas generator is typically triggered by an air bag firing circuit when the sensed vehicle acceleration exceeds a predetermined threshold value, as through the use of an acceleration-responsive inertial switch and an explosive "squib."

Conventional single gas generator inflation systems suffer from the disadvantage that the onset pressurization/inflation rate is generally set to provide an aggressive or rapid initial inflation in order to achieve a particular inflation time even for an occupant positioned relatively close to the air bag. However, an aggressive and uncontrolled onset rate of pressurization becomes problematic in situations where the occupant is out of position. More specifically, the rapid pressurization can cause the air bag to impact against the occupant with enough force to injure the occupant.

Occasionally, when single gas generator inflation systems are deployed, smaller occupants, usually children and smaller women, have been seriously injured. The airbag volume and inflating capacity are designed to protect both large and small occupants and are generally not variable within the single gas generator. Therefore, the inflation rate and volume of the airbag may result in an impact potentially hazardous to smaller occupants.

In commonly owned U.S. Pat. No. 5,400,487, Gioutsos et al teach an inflation system which overcomes the above-described problems by utilizing a plurality of gas generators which are controllably ignited to provide a variable inflation profile which can be tailored to any given occupant weight and/or position and for any crash type. While this arrangement dramatically improves the inflation efficiency so as to maximize an air bag's ability to protect an occupant, it does so at significantly higher expense and complexity. More specifically, the multiple gas generators and squibs add considerable cost to the system, while the firing control circuitry requires sophisticated processors capable of accurately timing the various ignition times.

Other designs include nonazide multi- or dual chamber systems that selectively deploy depending on design criteria such as the positioning and/or weight of the occupant, or on the speed of the collision. Dual chamber systems such as these are generally manufactured by welding the integral end closures of two inflator housings together, whereby two chambers are formed with a separating wall therebetween. Each housing is of a predetermined size that is determinative of the nonazide propellant capacity and consequently, of the inflating capability of each chamber. Upon collision, depending on the weight of the passenger, either chamber or both may be selectively ignited thereby inflating the protective airbag.

However, the inherently high ignition temperature of a nonazide propellant charge located in the first chamber produces enough heat energy to heat the separating wall and conductively ignite the nonazide propellant charge located in the second chamber. Therefore, one disadvantage of conventional dual chamber inflators is the likelihood of inadvertent ignition of an adjoining secondary chamber once a selected first chamber has been ignited. When attempting to leave the vehicle after a collision, occupants in positions skewed to the normal riding position may expose themselves to potential injury should an inflator inadvertently ignite and redeploy the airbag. Furthermore, rescuers attempting to remove the occupants from their vehicle may assume positions that could prove harmful should an airbag redeploy unexpectedly.

Finally, laser welding of the dual chamber generators described above is expensive. Furthermore, there is minimal tailorability of the size of the chamber; accordingly, each chamber/propellant tube must be cut and sized prior to welding, thereby accommodating a desired amount of propellant grains. Quite simply, the requirement of sizing the propellant tubes to form different size propellant chambers complicates the manufacturing process.

Therefore, a need still exists for a gas generator which can satisfactorily produce variable inflation pressurization at a reasonable manufacturing cost, and yet prevent hazardous redeployment of the system airbag.

SUMMARY OF THE INVENTION

Accordingly, it is an object of the present invention to provide an improved gas generator for use in a vehicle air bag inflation system which can satisfactorily produce variable inflation pressurization without inadvertent deployment of a second juxtaposed inflator system.

Another object of the present invention is to provide a dual chamber system that utilizes separate igniters and propellant beds, wherein each chamber operates independently of the other.

Yet another object of the present invention is to provide simplified manufacturing of the dual chamber inflator.

In accordance with these and other objects, the present invention comprises a gas generator comprising two combustion chambers formed within a single housing, wherein each chamber may be tailored to meet a desired inflation pressure thereby providing variable inflation pressurization. An insulating disc is disposed between the two chambers and functions as the back end of each chamber. More importantly, the disc eliminates heat transfer and flame propagation from one chamber to another, thereby precluding inadvertent ignition of a chamber not activated upon impact.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
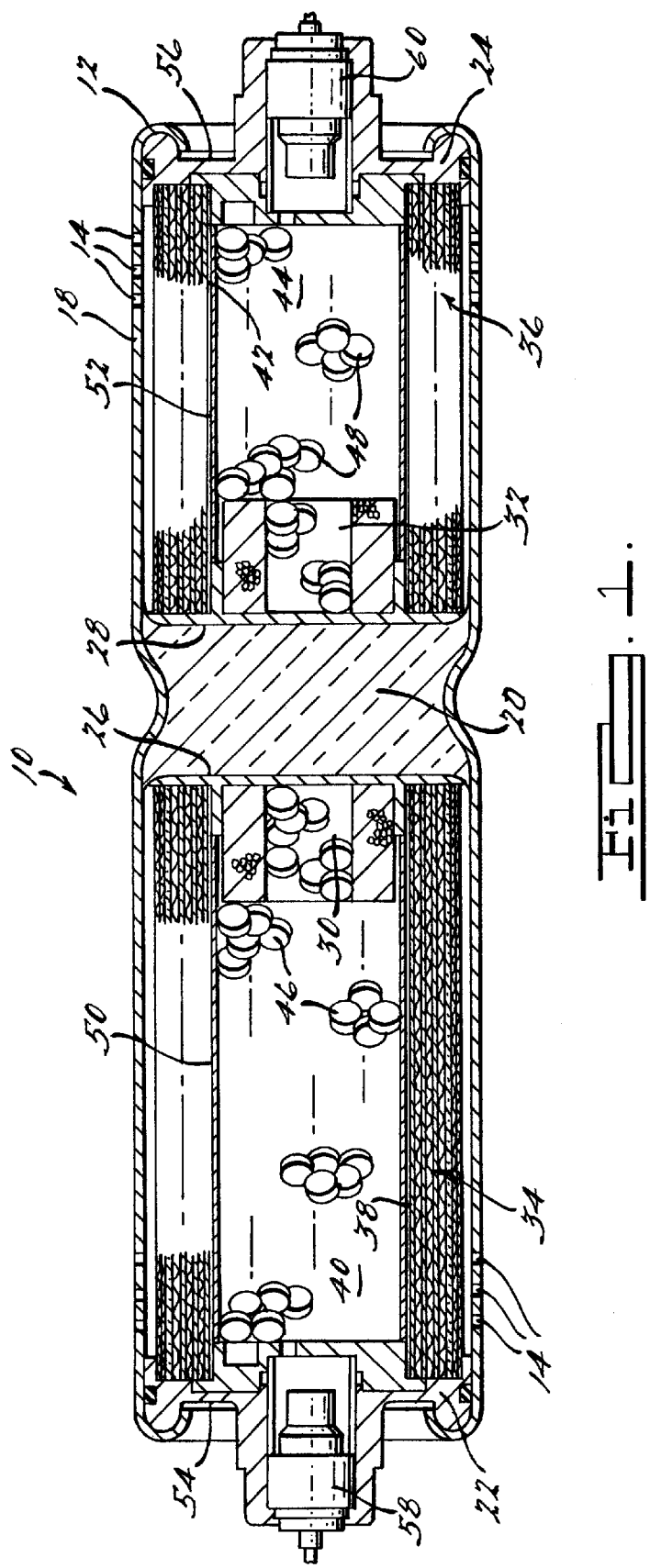
FIG. 1 is a longitudinal cross-sectional view of an inflator having two propellant chambers in accordance with a first exemplary embodiment.

As seen in FIG. 1 of the drawings, a dual chambered inflator 10 having particular utility for use in, for example, an automobile occupant restraint system, comprises a cylindrical housing 12 having a plurality of gas discharge orifices 14 disposed in a radially outer wall 18. In accordance with the present invention, an insulating disc 20 is intermediately disposed within housing 12 thereby defining a first and second inflator subassembly 22 and 24 on each side of disc 20.

A first and second endcap 26 and 28, each abut an opposite side of disc 20. Optional first and second autoignition cups 30 and 32 are press fitted against endcaps 26 and 28, respectively. A first and second filter assembly 34 and 36 extend longitudinally within housing 12, and are also press fitted against endcaps 26 and 28, respectively. An inner radial surface 38 of filter 34 forms a first chamber 40 and an inner radial surface 42 of filter 36 forms a second chamber 44. A first and second set of non-azide propellant grains 46 and 48 are stored within chambers 40 and 44, respectively. Optional first and second propellant foils 50 and 52 form laminar covers over radial inner surfaces 38 and 42, respectively, thereby providing increased pressure and enhanced flame front propagation within each subassembly. The housing 12 has a first end closure 54 and a second end closure 56 at an opposite end thereof that are both crimped in place thereby respectively sealing off each subassembly 22 and 24. Each end closure 54 and 56 accepts a conventional igniter 58 and 60, respectively, for selective ignition of corresponding propellant grains 46 and 48.

In accordance with the present invention, insulating disc 20 functions to preclude flame front and heat propagation from one chamber to another, and may be formed from any suitable insulating material such as reinforced plastic or ceramic. Reinforced plastic discs known as "haysite" are obtainable from, for example, the Haysite Co. located in Erie, Pa. Conductive heat transfer is thereby prevented from one chamber to another, and as such, inadvertent deployment of a dormant airbag is precluded.

The dual chambered filter 10 can be easily manufactured by inserting the insulating disc 20 within housing 12. Disc 20 should be inserted so that each point of its circumference or outer edge communicates with the inner wall of housing 12. Stated in another way, disc 20 should be fixed in a plane perpendicular to the longitudinal orientation of housing 12. The propellant capacity of each resultant chamber can be easily tailored by simply sliding the disc 20 to a respective distance from each end of housing 12. Once disc 20 is in place, housing 12 is roll formed to fixedly communicate with disc 20, thereby providing a sealing means between subassemblies 22 and 24. The remaining components are then installed as described above.

By way of illustration, filters 34 and 36, may be constructed as taught in the co-owned and copending application having Ser. No. 08/700,819 and entitled, "AIR BAG INFLATOR", the teachings of which are herein incorporated by reference. For example, each filter may comprise alternating layers of respective filtration media extending radially outwardly from chambers 40 and 44. Either filter may comprise any layered permutation of pierced stainless steel sheet metal, mesh stainless steel wire cloth obtainable from Wayne Wire Cloth, Hillman, Mich., and ceramic filter media such as Unifrax #204LE obtainable from Unifrax Corporation, Niagara, N.Y.

The aforesaid layered construction of filters 34 and 36 presents relatively course and heavy material to the high temperature gaseous products of combustion so as to function as a heat sink for the removal of heat and course particulates therefrom. Subsequently, relatively finer mesh wire cloth and the ceramic media effects the removal of fine particulates from the gas stream.

Because filters 34 and 36 are of right circular cylindrical configuration, they are easily formed into an assembly as, for example, by rolling and welding as taught in U.S. Pat. No. 5,547,217, also assigned to the assignee of the present invention.

In operation, either chamber 40 and 44, or both, are selectively ignited depending on the input to the system software. Thereafter, combustion gas flows radially outwardly from either propellant chamber 40 or 44, thence radially outwardly and circumferentially past either filter 34 or 36 thence exiting the inflator 10 through the apertures 14 in the radially outer wall 18 thereof. Exclusive operation of either chamber is ensured through the use of insulating disc 20 whereas inadvertent redeployment of the airbag is thus prevented.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. An air bag inflator comprising:

an elongated cylindrical metal housing;

a first propellant chamber at one end of said housing;

a second propellant chamber at an opposite end of said housing;

a discrete, non metallic, imperforate insulating disc exhibiting thermal conductivity less than said metal housing between said first and second propellant chambers for attenuating heat transfer therebetween; and, detent means on said housing engagable with said disc for positioning said disc longitudinally of said housing.

* * * * *